(12) United States Patent
Glugla et al.

(10) Patent No.: US 9,334,791 B2
(45) Date of Patent: May 10, 2016

(54) CHARGE AIR COOLER CONDENSATION CONTROL

(71) Applicants: Chris Paul Glugla, Macomb, MI (US); Garlan J. Huberts, Milford, MI (US); Michael Damian Czekala, Canton, MI (US)

(72) Inventors: Chris Paul Glugla, Macomb, MI (US); Garlan J. Huberts, Milford, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 890 days.

(21) Appl. No.: 13/621,696

(22) Filed: Sep. 17, 2012

(65) Prior Publication Data

US 2014/0075976 A1  Mar. 20, 2014

(51) Int. Cl.
| | |
|---|---|
| *F02B 29/04* | (2006.01) |
| *F28F 9/02* | (2006.01) |
| *F28F 17/00* | (2006.01) |
| *F28F 27/00* | (2006.01) |
| *F28F 27/02* | (2006.01) |
| *F02M 25/07* | (2006.01) |
| *F28G 7/00* | (2006.01) |

(52) U.S. Cl.
CPC ......... *F02B 29/0418* (2013.01); *F02B 29/0468* (2013.01); *F02B 29/0475* (2013.01); *F28F 9/0202* (2013.01); *F28F 17/005* (2013.01); *F28F 27/00* (2013.01); *F28F 27/02* (2013.01); *F02M 25/0707* (2013.01); *F02M 25/0713* (2013.01); *F28G 7/00* (2013.01); *Y02T 10/146* (2013.01)

(58) Field of Classification Search
CPC ............. F02B 29/0418; F02B 29/0468; F02B 29/0475; F28F 17/005; F28G 7/00
USPC .......................................................... 62/150
See application file for complete search history.

(56) References Cited

U.S. PATENT DOCUMENTS

| | | | |
|---|---|---|---|
| 6,247,525 B1 | 6/2001 | Smith et al. | |
| 6,367,256 B1 * | 4/2002 | McKee | F02M 25/0707 123/568.12 |
| 6,405,686 B1 | 6/2002 | Wettergard | |
| 2005/0021218 A1 * | 1/2005 | Bhargava | F02D 41/0007 701/108 |
| 2005/0081523 A1 * | 4/2005 | Breitling | F02B 29/0418 60/599 |
| 2007/0251249 A1 | 11/2007 | Burk | |
| 2008/0121373 A1 | 5/2008 | Wang et al. | |
| 2010/0077995 A1 * | 4/2010 | Buia | F02B 29/0468 123/542 |
| 2012/0090582 A1 * | 4/2012 | Yacoub | F01N 9/00 123/568.11 |

FOREIGN PATENT DOCUMENTS

WO   WO 2008002423 A2 *  1/2008  ............. C10G 75/00

* cited by examiner

*Primary Examiner* — Jonathan Bradford
(74) *Attorney, Agent, or Firm* — Julia Voutyras; Alleman Hall McCoy Russell & Tuttle LLP

(57) ABSTRACT

Embodiments for controlling condensate in a charge air cooler are provided. One example method for an engine includes cooling intake air through a charge air cooler and adjusting a vibration device of the charge air cooler based on charge air cooler condensation conditions.

19 Claims, 4 Drawing Sheets

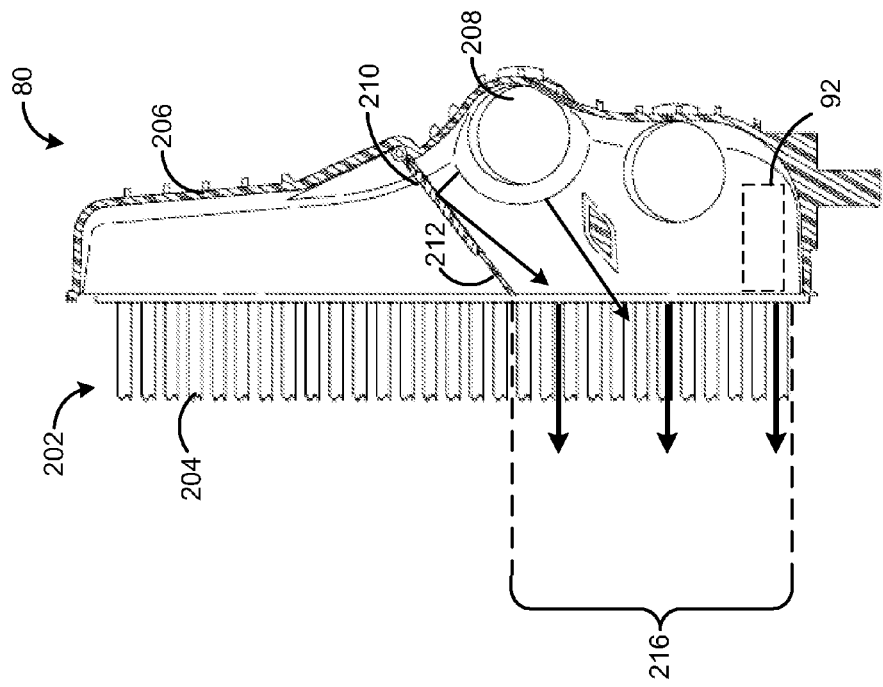
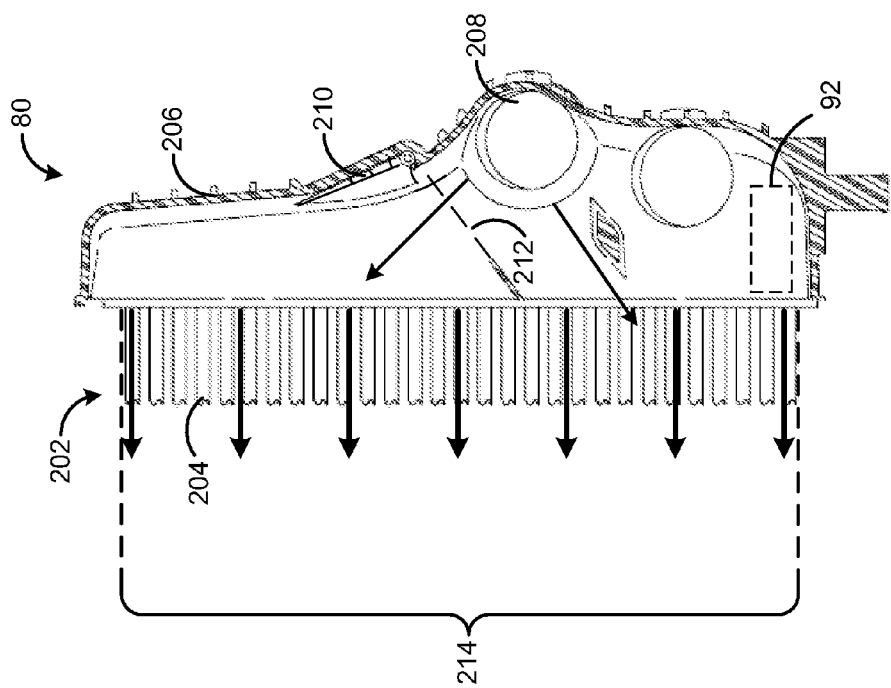

CHARGE AIR COOLER CONDENSATION CONTROL

FIELD

The present disclosure relates to an internal combustion engine.

BACKGROUND AND SUMMARY

Turbocharged and supercharged engines may be configured to compress ambient air entering the engine in order to increase power. Because compression of the air may cause an increase in air temperature, a charge air cooler may be utilized to cool the heated air thereby increasing its density and further increasing the potential power of the engine. If the humidity of the ambient air is high, however, condensation (e.g., water droplets) may form on internal surfaces of the charge air cooler that are cooler than the dew point of the compressed air. During transient conditions such as hard vehicle acceleration, these water droplets may be blown out of the charge air cooler and into the combustion chambers of the engine resulting in increased potential for engine misfire, loss of torque and engine speed, and incomplete combustion, for example.

One approach for controlling condensate in a charge air cooler is described in U.S. patent application Ser. No. 2007/0251249. Here, a vibration transducer is activated to vibrate the surfaces of the charge air cooler and break up accumulated condensate into small droplets, in order to detach the condensate from the surfaces of the charge air cooler and sweep it to the engine in small quantities. However, the amount of condensate in the charge air cooler can vary with operating conditions, and activation of the vibration transducer may not be sufficient to dislodge larger quantities of condensate.

The inventors have recognized the issues with the above approach and offer a method to at least partly address them. In one embodiment, a method for an engine comprises cooling intake air through a charge air cooler and adjusting a vibration device of the charge air cooler based on charge air cooler condensation conditions.

In this way, the vibration device may be activated based on condensation conditions within the charge air cooler. For example, if conditions indicate a large (higher) amount of condensate has accumulated within the charge air cooler, the intensity of the vibrations emitted by the device may be increased. Furthermore, by activating the device responsive to condensate formation, the device may remain deactivated during conditions of no (or lower) condensate accumulation, reducing the energy needed to operate the device.

In some examples, the vibration device may be coordinately controlled with a charge air cooler valve arranged in the inlet of the charge air cooler. The charge air cooler valve may selectively modulate intake air flow through the charge air cooler; for example, the intake air may flow through the entirety of the charge air cooler when the charge air cooler valve is open and flow through a subset of the charge air cooler when the valve is closed. By directing intake air through a subset of the charge air cooler, intake air velocity increases, reducing accumulation of condensate on the surfaces of the charge air cooler and/or entraining condensate into the intake air flow. In one example, by combining control of the vibration device with the charge air cooler valve (e.g., by adjusting the vibration device activation and/or intensity based on the valve position, or vice versa), the vibration device may be used to disperse collected condensate during conditions of lower condensate formation, while the charge air cooler valve may be closed to disperse and prevent accumulation of condensate during conditions of higher condensate formation. Furthermore, in other examples, the vibration device may be used to disperse condensate during conditions where the charge air cooler valve is prevented from closing, such as during high load conditions where maximal cooling of the intake air is indicated.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows a schematic diagram of an inlet portion of an example charge air cooler intake including a valve in an open position.

FIG. 2B shows a schematic diagram of the charge air cooler inlet of FIG. 2A with the valve in a closed position.

DETAILED DESCRIPTION

Condensation formation in a charge air cooler may be detrimental to the engine, as the introduction of the condensate to the cylinders during combustion may cause combustion instability and/or misfire. Further, condensation formation may degrade the charge air cooler, particularly if accumulated condensate freezes during an extended engine-off period. To reduce the accumulation of condensation, a vibration device may be positioned in or on the charge air cooler. The vibration device may be activated to create ultrasonic sound waves, for example, that disperse droplets of condensate accumulated on the surfaces of the charge air cooler. These smaller droplets may then be collected in a condensation trap or swept to the engine.

Figure 1:
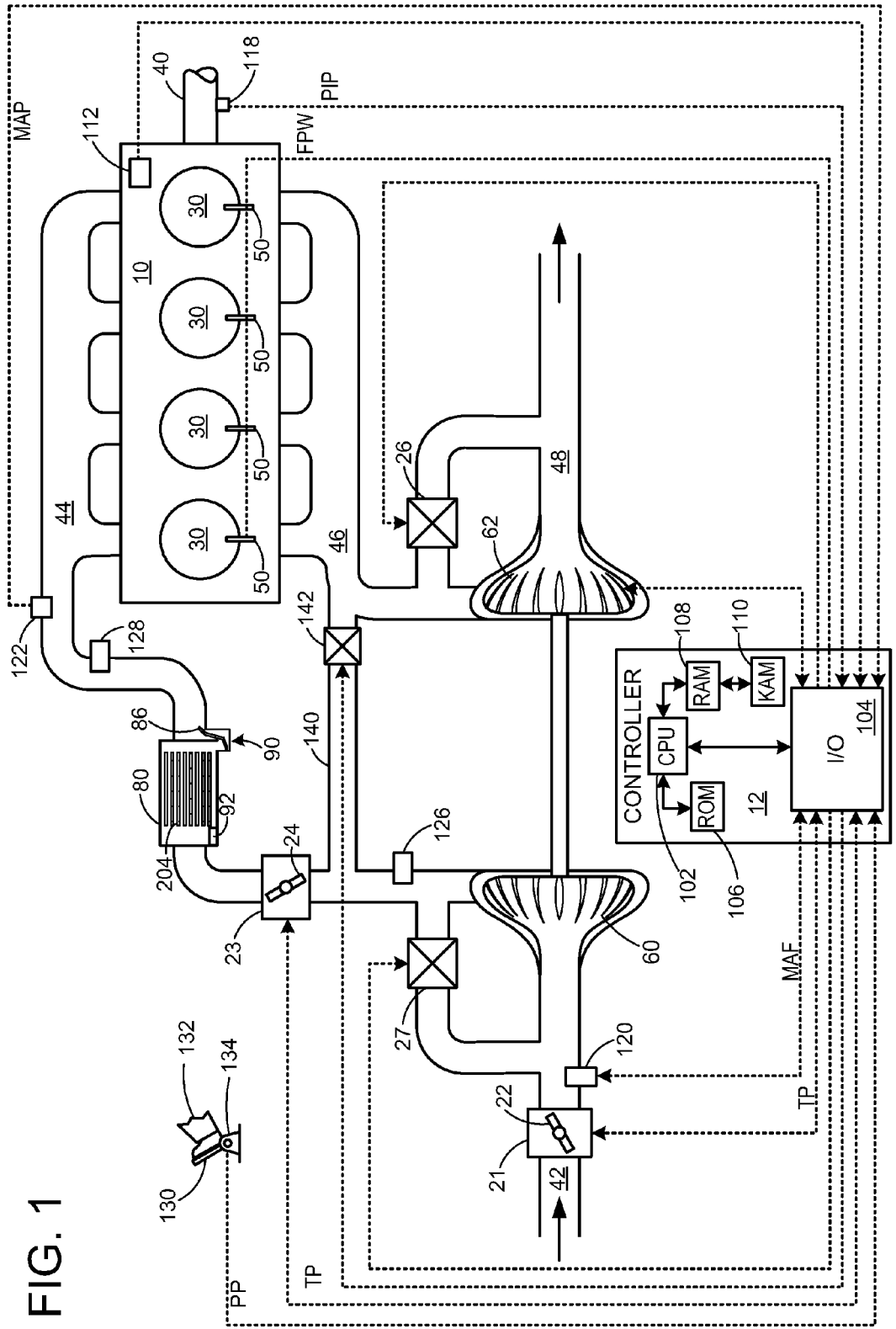
FIG. 1 is a schematic diagram of an example engine including a charge air cooler.

Furthermore, a valve positioned in the inlet of the charge air cooler may be closed to selectively route the intake air through a sub-section of the charge air cooler to increase the velocity of the intake air, relative to the velocity of the intake air when it travels through an entirety of the charge air cooler. The valve may be opened or closed in response to a condensation formation value, which provides an estimate of the likelihood that condensation will form within the charge air cooler. FIG. 1 is a diagram of an engine system including a charge air cooler. The charge air cooler inlet valve is shown in FIG. 2A in its open position and in FIG. 2B in its closed position. The engine system of FIG. 1 also includes a controller configured to carry out the methods depicted in FIGS. 3 and 4.

First, FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42. For example, as depicted in FIG. 1, an additional throttle 23 having a throttle plate 24 is located downstream of compressor 60. Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge-air-cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor recirculation valve (CRV) 27 configured to divert intake air around compressor 60. Wastegate 26 and/or CRV 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. Charge air cooler 80 includes a plurality of cooling tubes 204 through which intake air is cooled.

In the example of FIG. 1, a condensation trap 90 is shown coupled to charge air cooler 80. The condensation trap may be utilized to collect water droplets that accumulate within the charge air cooler. Condensation trap 90 comprises a reservoir that is positioned at a low point of charge air cooler 80 such that water droplets that pass though the opening of the trap may be collected and, under some conditions, temporarily stored. Condensation trap 90 further comprises a tube 86 which passes through the opening of the trap. As shown in FIG. 1, tube 86 is disposed to have a first end in the reservoir and a second end in the airflow of the intake passage. The first end may extend nearly to the bottom of the reservoir. As such, low levels (e.g., small amounts) of condensate may be removed from the reservoir.

While condensation trap 90 may collect condensate that accumulates along the bottom of charge air cooler 80, under some conditions, condensate may travel past the condensation trap 90 to the engine. For example, condensate may form on the surfaces of the cooling tubes 204, and during a strong transient event, such as a sudden tip-in, the condensate may rapidly dislodge from charge air cooler 80 and travel past condensation trap 90 to the engine as a large slug of condensate. To prevent these large slugs from reaching the engine, where they may cause engine misfire, a vibration device 92 may be positioned in or on charge air cooler 80. Vibration device 92 may emit ultrasonic waves that vibrate the surfaces of charge air cooler 80, breaking the surface tension of the condensate that has collected on the walls of the cooling tubes 204 and/or along the bottom of the charge air cooler 80. In doing so, the condensate that collects on the cooling tubes 204 may be dislodged and fall to the bottom of the charge air cooler 80, where it may eventually move to the condensation trap 90. Depending on the size of the water droplets that have condensed on the cooling tubes and the intensity of the vibrations produced by vibration device 92, the condensate may also be entrained within the intake air moving through the charge air cooler 80.

Vibration device 92 may be positioned in a suitable location relative to charge air cooler 80. For example, vibration device 92 may be positioned along a bottom surface of charge air cooler 80, as depicted in FIG. 1. In other examples, vibration device 92 may be positioned within a cooling tube, on a top surface of charge air cooler 80, on an outer wall of charge air cooler 80, etc. Furthermore, while one vibration device is depicted in the illustrated embodiment, it is to be understood that two or more vibration devices may be present. Additionally, vibration device 92 may emit waves in a frequency other than ultrasonic.

Vibration device 92 may produce ultrasonic waves in response to a signal sent from controller 12. The duration and intensity of the vibrations produced by vibration device 92 may also be controlled by controller 12. For example, the frequency and/or amplitude of the sound waves produced by vibration device 92 may be adjusted in response to a signal sent from controller 12.

As described in more detail below, charge air cooler 80 may include a valve (depicted in FIGS. 2A and 2B and described in more detail below) to selectively modulate the flow velocity of intake air traveling through the charge air cooler 80 in response to condensation formation within the charge air cooler. The valve may be controlled to increase the velocity of the intake air, preventing the accumulation of condensate and/or entraining collected condensate with the intake air. As described in further detail below, the vibration device 92 and valve may be coordinately controlled to prevent release of large amounts of condensate to the engine.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a boost pressure sensor 126. Additionally, one or more sensors 128 for detecting transient changes in intake air water content may be present downstream of charge air cooler 80. Sensors 128 may include a humidity sensor, an intake oxygen sensor (such as an intake UEGO sensor), or other sensors that may detect humidity. Other sensors not depicted may also be present, such as a sensor for determining the intake air velocity at the inlet of the charge air cooler, a temperature sensor at the outlet of the charge air cooler 80, and other sensors. In some examples, storage medium read-only memory 106 may be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, ignition system, etc.

Turning now to FIGS. 2A and 2B, an inlet side of charge air cooler 80 is depicted. As depicted in both FIGS. 2A and 2B, charge air cooler 80 includes an operable thermal transfer area 202 configured to transfer heat from inside the charge air cooler 80 to outside of the charge air cooler 80. The charge air cooler 80 includes a plurality of cooling tubes 204 located in the thermal transfer area 202 of charge air cooler 80. The plurality of cooling tubes 204 are in fluidic communication with an inlet tank 206. Also shown positioned within inlet tank 206 is vibration device 92. However, vibration device 92 may be positioned in other suitable locations within or near charge air cooler 80. Inlet tank 206 is configured to receive intake air via one or more inlet passages 208 coupled to an upstream region of an intake passage (not shown in FIGS. 2A and 2B). The intake air flows from the inlet tank 206 to the plurality of cooling tubes 204. After passing through the cooling tubes 204, the intake air is routed through an outlet tank (not shown) coupled to a downstream region of the intake passage. The charge air cooler 80 may also include a charge air cooler valve 210 configured to change the operable thermal transfer area from a first volume 214 (shown in FIG. 2A) comprising a relatively large area to second volume 216 (shown in FIG. 2B) comprising a relatively small area.

Inlet tank 206 may include a divider 212 that partitions inlet tank 206 into a first portion and a second portion. Divider 212 may include one or more holes. FIG. 2A depicts valve 210 in an open position. When valve 210 is open, intake air may pass through one or more holes of divider 212 such that intake air flows through both the first and second portions of inlet tank 206 and through the first volume 214 of the charge air cooler 80. Substantially all of the plurality of cooling tubes 204 may define the first volume 214. In one example, the charge air cooler 80 may include 21 cooling tubes, and the first volume 214 may include all 21 cooling tubes.

FIG. 2B depicts valve 210 in the closed position. When closed, valve 210 blocks the one or more holes of divider 212. Thus, intake air only flows through the first portion of the inlet tank 206 and through the second volume 216 of the charge air cooler 80. A portion of the plurality of cooling tubes 204 may define the second volume 216. The second volume 216 is contained wholly within the first volume 214. That is, the cooling tubes that comprise the second volume 216 also comprise a portion of the first volume 214. Therefore, when valve 210 is closed, intake air flows through only the second volume 216, and when valve 210 is open, intake air flows through the first volume 214, which contains the second volume 216. In one example, the charge air cooler 80 may include 21 cooling tubes, and the second volume 216 may include less than 21 cooling tubes. The second volume 216 may include less than half the cooling tubes that comprise the first volume 214, such as 9 cooling tubes.

The valve 210 may be, or may be similar to, a flapper valve. The valve 210 may include a seat member (e.g., divider 212) comprising a substantially flat stationary member having one or more holes there through. A closure member, for example a flap, or plate may be configured to move a first position spaced from the seat member thereby opening the one or more holes wherein intake air is able to flow into the first volume 214, to a second position adjacent to the seat member thereby closing the one or more holes wherein intake air is able to flow into only the second volume 216.

The divider 212 may be part of the valve 210. For example, the divider 212 may be a valve seat. The divider 212 may also be a dividing line or datum, or the like, functionally dividing the charge air cooler 80 into the two portions. Some embodiments may include two or more dividers dividing the inlet into three or more portions. In some examples one or more configurations described herein regarding the inlet tank 206 may instead, or in addition, be included in an outlet tank (not shown). Substantially all of the plurality of cooling tubes 204 may be in mutual fluidic communication with the outlet tank. It will be understood that instead, all the tubes may be in fluid communication on the inlet side and divided at the outlet side into two or more portions of tubes. A similarly configured valve may also be included in the outlet tank and function to control whether the fluid is allowed to pass or prevented from passing through a similarly configured hole.

Various embodiments may include an actuator (not illustrated) to open and to close the valve 210. The actuator may be one or more of: an electronic actuator, a vacuum controlled actuator, a mechanical pressure diaphragm, a pulse-width modulated electronic control. When the inlet air is allowed to pass through all the tubes of the charge air cooler, i.e. when the valve is open, the inlet air will also experience a drop in pressure and the valve will be exposed on both sides to the pressure of the incoming inlet air. In this way the actuator may only need to provide a motive force to open and to close the valve in order to change the valve from an open state to a close state, but may not need to provide force to keep the flap open or to keep the flap closed.

Thus, FIGS. 2A and 2B depict a charge air cooler configured to selectively direct intake air through either a first, larger volume or a second, smaller volume via modulation of a valve arranged in the charge air cooler. In some embodiments, the valve may be mechanically modulated based on intake air flow, e.g., the valve flap or plate may be kept closed by spring tension that is calibrated to match air flow, such that the valve flap opens under conditions of high air flow. Thus, during low air flow conditions, the intake air may be directed through the second volume of the charge air cooler, increasing the intake air flow velocity through the cooler to prevent condensation accumulation. In other embodiments, the valve may be controlled by a controller, such as controller 12 of FIG. 1, based on various operating conditions. For example, the valve may be open during low condensation formation conditions and commanded closed during conditions of high condensation formation.

Figure 3:
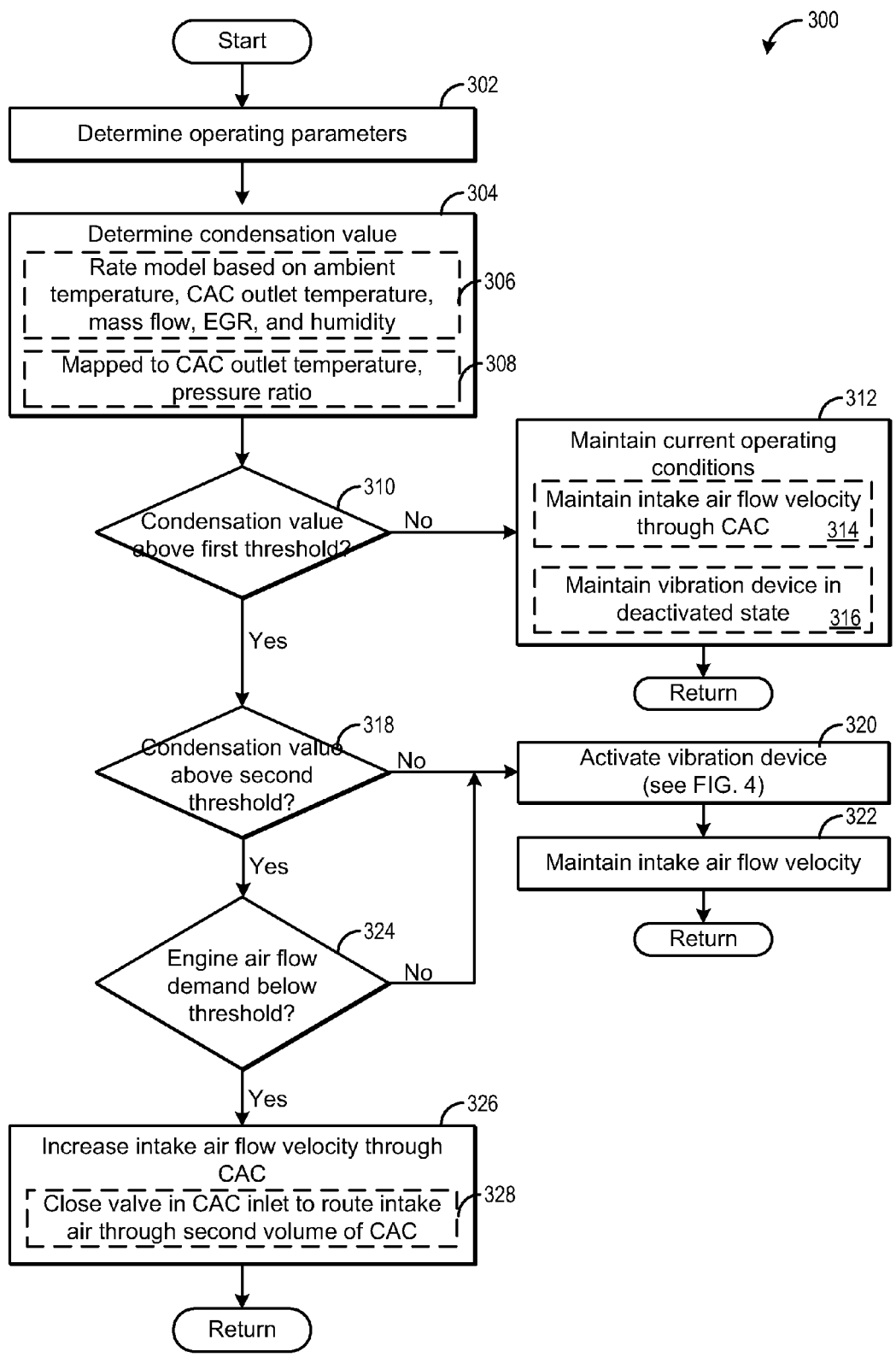
FIG. 3 is a flow chart illustrating a method for controlling condensate in a charge air cooler according to an embodiment of the present disclosure.

FIG. 3 is a flow chart illustrating a method 300 for controlling condensate in a charge air cooler. Method 300 may be carried out by a controller (e.g., controller 12) according to instructions stored thereon to regulate activation of a vibration device positioned within the charge air cooler (such as device 92) and to coordinately regulate the position of a charge air cooler inlet valve in the charge air cooler based on condensation formation.

At 302, method 300 includes determining engine operating conditions. The determined engine operating conditions may include engine speed and load, ambient temperature, MAF, MAP, EGR amount, humidity, and other parameters. At 304, a condensation formation value is determined from the operating conditions. The condensation formation value may be an indicator of the likelihood that condensation will form within the charge air cooler. In some embodiments, the condensation formation value may be the intake air flow velocity determined based on the MAF signal, for example. In another embodiment, the condensation formation value may be the difference between the dew point of the intake air, determined based on the humidity of the intake air and ambient temperature, and the temperature of the charge air cooler. In other embodiments, the condensation formation value may be the load of the engine.

The above embodiments for determining a condensation value estimate the likelihood of condensation formation based one or two simple factors. However, multiple factors may influence condensation formation within the charge air cooler, such as both the velocity of the air flow and the dew point of the intake air. To provide for an indication of condensation formation with increased accuracy, determining the condensation value may include determining a condensation formation rate based on a model at 306. The model may include inputs of ambient temperature, charge air cooler outlet temperature, mass air flow, EGR flow, and humidity. If the humidity is not known (for example, if the engine does not include a humidity sensor), the humidity may be set to 100%. As explained above, the ambient temperature and humidity may provide an indication of the dew point of the intake air, which may be further affected by the amount of EGR in the intake air (e.g., EGR may have a different humidity and temperature than the air from the atmosphere). The difference between the dew point and the charge air cooler outlet temperature indicates whether condensation will form within the cooler, and the mass air flow may affect how much condensation actually accumulates within the cooler. The condensation formation rate itself may be the condensation formation value. In other embodiments, the condensation formation rate may be used to determine an amount of condensation that has accumulated during a given time period, and the condensation amount may be the condensation formation value.

A simpler mechanism for determining a condensation value may include a condensation formation value that is mapped to charge air cooler outlet temperature and charge air cooler pressure ratio at 308. The charge air cooler pressure ratio may be provide an indication of the change in dew point that may occur as the intake air flows through the compressor and the charge air cooler; for example, the increase in pressure resulting from the action of the compressor and the charge air cooler may raise the dew point of the intake air above the temperature of the charge air cooler outlet, resulting in condensation. The charge air cooler pressure ratio may be the difference in pressure between the ambient pressure of the intake air and the pressure of the air downstream of the charge air cooler. In another embodiment, the condensation formation value may be mapped to charge air cooler outlet temperature and engine load. Engine load may be a function of air mass, torque, accelerator pedal position, and throttle position, and thus may provide an indication of the air flow velocity through the charge air cooler. For example, a moderate engine load combined with a relatively cool charge air cooler outlet temperature may indicate a high condensation formation value, due to the cool surfaces of the charge air cooler and relatively low intake air flow velocity. The map may include a modifier of ambient temperature.

At 310, method 300 includes determining if the condensation formation value exceeds a first threshold. The threshold condensation formation value may be indicative of the likelihood that condensation may form on the surfaces of the charge air cooler. For example, condensation formation values below the first threshold may indicate a low likelihood (or no likelihood) that condensation will accumulate in the charge air cooler. Condensation formation values above the first threshold may indicate a moderate to high likelihood that condensate will form in the charge air cooler.

The threshold condensation formation value may be set dependent on how the condensation value was determined at 304. For example, if the condensation formation value is the difference between the dew point of the intake air and the charge air cooler temperature, the threshold may be zero. If the condensation formation rate is determined as the formation value, the threshold may be a condensation formation rate that indicates a suitable amount of condensation has formed (or is likely to form) to potentially cause engine stability issues. If the condensation formation value is determined based on the temperature/load map, the map may provide a numerical value (e.g., between 0-1) indicative of the likelihood of condensation, and this may be compared a threshold.

In some embodiments, the first threshold may be a threshold above which condensation forms and below which condensation does not form. In this way, any indication of condensation may be above the threshold. However, in other embodiments, the first threshold may be set such that a small amount of condensation is allowed to accumulate.

If the condensation formation value does not exceed the first threshold, method 300 proceeds to 312 to maintain current operating parameters. The current operating parameters may include maintaining current intake air flow velocity at 314 (e.g., by maintaining the charge air cooler valve in the open position to route the intake air through the first, larger volume of the charge air cooler) and deactivating or maintaining the vibration device in a deactivated state at 316. Method 300 then returns.

If the formation value does exceed the first threshold, method 300 proceeds to 318 to determine if the formation value exceeds a second threshold. The second threshold may be different than the first threshold. For example, the second threshold may be higher, or indicative of a greater amount or greater likelihood of accumulated condensate within the charge air cooler. In one example, the second threshold may indicate an amount of condensate that is too large to be dispersed solely by the vibration device.

If the condensation formation value does not exceed the second threshold, method 300 proceeds to 320 activate the vibration device to break the surface tension of the condensate and allow the condensate to drop out of the charge air cooler to the condensation trap. Additional details regarding activating the vibration device will be presented below with respect to FIG. 4. At 322, the intake air flow velocity is maintained (by maintaining the charge air cooler valve in the open position, for example), and then method 300 returns.

If the condensation formation value does exceed the second threshold at 318, method 300 proceeds to 324 to determine if the engine air flow demand is below a threshold. When the condensation formation value exceeds the second threshold, a valve in the charge cooler may be closed to increase intake air flow velocity and remove and/or prevent condensation accumulation in the charge air cooler. However, when the valve is closed, the pressure drop across the charge air cooler increases, limiting air flow to the intake of the engine via the charge air cooler. Thus, the valve in the charge air cooler may be closed dependent on the air flow demands of the engine such that the valve is kept open if the air flow demands are high, to avoid a disturbance in torque.

The air flow demand of the engine may be determined based on engine speed and load, manifold pressure, etc. The threshold air flow demand may be based on the amount of air the charge air cooler is configured to pass when the valve is closed.

If the engine air flow demand is not below the threshold, method 300 proceeds to back to 320 to activate the vibration device and maintain current intake flow velocity. If the air flow demand is below the threshold, method 300 proceeds to 326 to increase the intake air flow velocity through the charge air cooler. As explained above, increasing the intake air flow velocity may prevent condensation accumulation by entraining the condensate within the air flow. Increasing the intake air flow velocity includes closing the valve in the inlet of the charge air cooler to route the intake air through the second, smaller volume of the charge air cooler at 328. When the charge air cooler valve is closed, the vibration device may remain deactivated, as the increased air flow velocity may be sufficient to remove the condensate. However, in some embodiments, the vibration device may be activated when the valve is closed, to assist in the dispersion of the condensate. For example, the intake air flow velocity may not be high enough to disperse all the accumulated condensate even with the valve closed. The vibration device may then be activated to disperse accumulated condensate under such conditions. In some embodiments, when the charge air cooler valve is closed, the vibration device may operate with different output than when the charge air cooler valve is open. The vibration device may operate with lower intensity vibrations when the valve is closed than when the valve is open in one example. In another example, the vibration device may operate with higher intensity vibrations when the valve is closed. Method 300 then returns.

Figure 4:
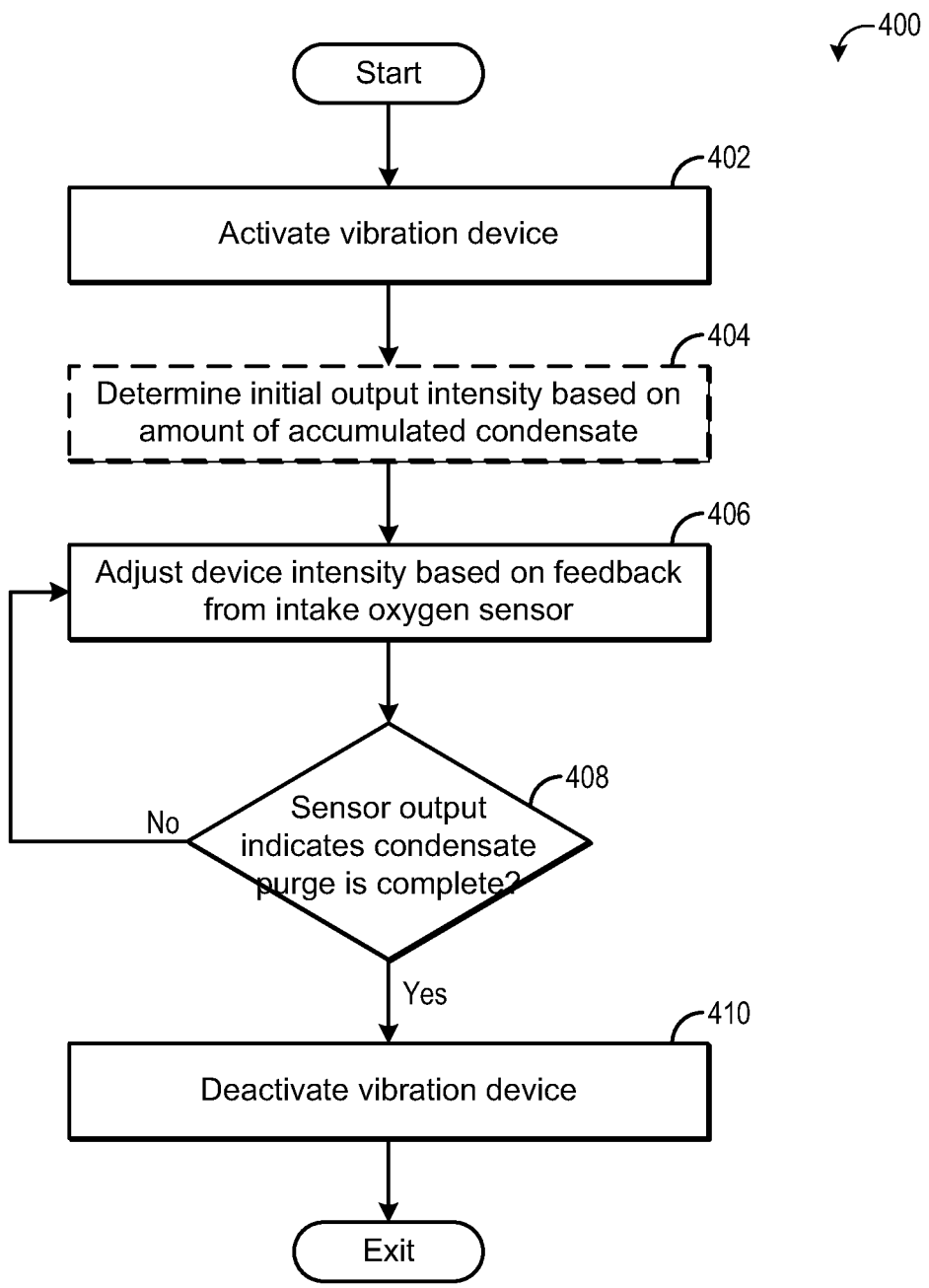
FIG. 4 is a flow chart illustrating a method for activating a vibration device according to an embodiment of the present disclosure.

FIG. 4 illustrates a method 400 for controlling a vibration device (such as vibration device 92 of FIG. 1). Method 400 may be carried out by an engine controller (e.g., controller 12), according to instructions stored thereon, in response to an indication to activate the vibration device. For example, during the execution of method 300, if it is indicated to activate the vibration device, method 400 may be performed.

Method 400 includes, at 402, activating the vibration device. As explained previously, the vibration device outputs ultrasonic sound waves to disperse accumulated condensate in the charge air cooler. The intensity of the output of the vibration device may be adjusted by the controller in response to one or more operating parameters. The initial intensity of the vibration device (e.g., the initial frequency and amplitude of the ultrasonic waves) may be optionally set based on the amount of accumulated condensate at 404. For example, the vibration device output may increase in intensity as the amount of condensate increases. The vibration device output may include the frequency and/or amplitude of the sound waves produced by the device, the duration that the vibration device is activated, the duty cycle of the vibration device, or other suitable outputs. However, the output of the vibration device may be the same regardless of the amount of condensate in some embodiments.

At 406, the intensity of the vibration device output may be adjusted based on feedback from an intake oxygen sensor (such as sensor 128). The intake oxygen sensor may be located downstream of the charge air cooler, and may be used to provide an indication of the amount of water in the intake air. Based on feedback from the sensor, the vibration device may be controlled to disperse the condensate at desired rate. For example, the condensate may be dispersed at a rate that does not result in engine misfire or other combustion issues. Additionally, based on feedback from the oxygen sensor, degradation of the vibration device may be indicated if the device is activated, yet the water content of the intake air downstream of the charge air cooler does not increase. Further, in some embodiments, the intake oxygen sensor may be used to validate the model that determines the condensation formation value (as described above with respect to FIG. 3). For example, the amount of condensate released from the charge air cooler may be determined based on feedback from the intake oxygen sensor, and this amount may be correlated to the condensation formation value determined by the model.

At 408, it is determined if the oxygen sensor output indicates the condensate purge from the charge air cooler is complete, e.g., if the sensor determines that the water content of the intake air has returned to pre-device activation levels. If the sensor is still indicating increased water content in the intake air, method 400 loops back to 406 to continue to adjust the vibration device based on sensor feedback. If the sensor indicates all condensate has been released from the charge air cooler, method 400 proceeds to 410 to deactivate the vibration device, and then method 400 exits.

Thus, the methods and system described above provide for cooling intake air via charge air cooler. A vibration device of the charge air cooler may be activated based on condensation conditions. The condensation conditions may be indicative of the amount of condensate that has or will accumulate in the charge air cooler. The condensation conditions may include engine load, intake air temperature and/or humidity, charge air cooler temperature, EGR rate, etc. In one example, a condensation formation rate may be calculated based on mass air flow, charge air cooler outlet temperature, EGR amount, and ambient temperature. The condensation formation rate may be used to determine an amount of accumulated condensate in the charge air cooler.

The vibration device may be activated if the amount of accumulated condensate exceeds a first threshold. The output of the vibration device may be correlated to the amount of condensate. Additionally, the output of the vibration device may adjusted based on feedback from intake oxygen sensor located downstream of the charge air cooler. If the amount of accumulated condensate exceeds a second threshold, greater than the first threshold, a charge air cooler valve arranged in the inlet of the charge air cooler may be closed to increase the intake air velocity through the charge air cooler. When the charge air cooler valve is closed, the vibration device may remain activated, or it may be inactivated.

In another example, the charge air cooler valve position may be adjusted based on the operating state of the vibration device. For example, the charge air cooler valve may be configured to close when the vibration device is activated. As the vibration device is activated based on the amount of accumulated condensate in the charge air cooler, activation of the vibration device may be indicative of condensate in the cooler, and thus the valve may be closed to assist in the dispersal of the condensate. In a further example, if the vibration device is deactivated during conditions of condensate accumulation (e.g., the vibration device is degraded), the charge air cooler valve may close in order to disperse the condensate that would have otherwise been dispersed by the vibration device.

In a further example, the vibration device activation and/or intensity may be adjusted based on the position of the charge air cooler valve. In an embodiment, the vibration device may be deactivated when the charge air cooler valve is in the closed position. When the valve is closed, the increased intake air velocity may be sufficient to disperse the condensate, and operation of the vibration device may be dispensed with. However, in another embodiment, the vibration device may be activated when the charge air cooler valve is in the closed position. The valve may closed during conditions of higher condensate in the charge air cooler, and thus the vibration device may be activated with the valve is closed to assist in the dispersal of the condensate.

The vibration device may also be activated during high engine load conditions and/or during high intake velocity conditions. During these conditions, the charge air cooler valve may be in the open position. During low to mid engine load and/or low intake air velocity conditions, the charge air cooler valve may be closed to increase the intake air velocity through the charge air cooler. The charge air cooler valve increases the intake air velocity by routing the intake air through a smaller volume of the charge air cooler when the valve is closed, and when the valve is open, the intake air flows through a larger volume of the charge air cooler. The larger volume may be the entirety of the charge air cooler, while the smaller volume may be a subset of the charge air cooler that is contained within the larger volume.

Thus, during a first mode of operation, intake air may travel through an entirety of the charge air cooler and condensate in the charge air cooler may be dispersed via a vibration device. During a second mode of operation, intake air may travel though a subset of the charge air cooler. The first mode of operation may comprise estimated condensation in the charge air cooler below a first threshold, high engine load, and/or high intake air velocity. The second mode may comprise estimated condensation in the charge air cooler above the first threshold, low to mid engine load, and/or lower intake air velocity. A valve in the inlet of the charge air cooler may be closed to route intake air through the subset of the charge air cooler.

The vibration device may be activated during the first mode of operation. The vibration device may be activated when estimated accumulated condensate in the charge air cooler is above a second threshold. The second threshold may be lower than the first threshold. During the second mode of operation, the vibration device may be deactivated, or it may be activated. If the vibration device is activated during the second mode, the vibration device may operate with different intensity during the second mode than during the first mode.

An engine system is provided. The system may include an intake passage coupled to an intake manifold of the engine and a charge air cooler positioned in the intake passage between a compressor and the intake manifold. The charge air cooler may include an inlet including a valve to selectively direct intake air flow through a subset or an entirety of the charge air cooler, a plurality of cooling tubes, an outlet, and a vibration device to disperse accumulated condensate. The system may also include a controller including instructions to activate the vibration device when accumulated condensate in the charge air cooler exceeds a first threshold. The controller may include further instructions to close the valve to route intake air through the subset of the charge air cooler when the accumulated condensate exceeds a second threshold, higher than the first threshold.

The controller may include instructions to activate the vibration device when an amount of exhaust gas recirculation (EGR) exceeds a threshold. EGR may have a relatively high amount of humidity, particularly if the EGR is low-pressure EGR (LP-EGR). Thus, when high amounts of EGR are present in the intake air upstream of the charge air cooler, condensate may be likely to form in the charge air cooler, and the vibration device may be activated to disperse the condensate. The controller may also include instructions to activate the vibration device when engine load is below a threshold. Low engine load conditions may result in a high level of condensate, as the flow velocity of the intake air may not be sufficient to entrain the condensate. However, during low load conditions, the charge air cooler valve may be closed to increase the intake air velocity and prevent condensation accumulation. When the valve is closed, the vibration device may remain activated, or it may be deactivated. In other embodiments, the controller may include instructions to activate the vibration device when engine load is above a threshold. During high engine load conditions, the charge air cooler valve may be kept open, even if condensate is accumulating in the charge air cooler, in order to provide sufficient cooling to the intake air. To control condensate, the vibration device may be activated.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
cooling intake air through a charge air cooler;
adjusting a vibration device of the charge air cooler based on charge air cooler condensation conditions; and
adjusting a valve arranged in an inlet of the charge air cooler based on condensation conditions, and based on a state of the vibration device.

2. The method of claim 1, wherein the condensation conditions comprise engine load and charge air cooler outlet temperature.

3. The method of claim 1, wherein the condensation conditions comprise an estimated amount of accumulated condensate.

4. The method of claim 3, wherein the estimated amount of accumulated condensate is based on mass air flow, ambient temperature, charge air cooler outlet temperature, and an amount of exhaust gas recirculation.

5. The method of claim 1, wherein adjusting the vibration device based on charge air cooler condensation conditions further comprises activating the vibration device when an estimated amount of accumulated condensate is above a threshold.

6. The method of claim 5, further comprising increasing output of the vibration device as the estimated amount of accumulated condensate increases.

7. The method of claim 1, further comprising adjusting output of the vibration device based on feedback from an intake oxygen sensor positioned downstream of the charge air cooler.

8. The method of claim 1, further comprising adjusting vibration device activation and intensity based on a position of the valve.

9. A method for an engine, comprising:
during a first mode of operation, routing intake air through an entirety of a charge air cooler with a charge air cooler valve in a first position and dispersing condensate in the charge air cooler via a vibration device of the charge air cooler; and
during a second mode of operation, routing intake air through a subset of the charge air cooler with the valve in a second position, wherein
vibration device activation and intensity are adjusted based on the position of the valve, and further based on feedback from an intake oxygen sensor.

10. The method of claim 9, wherein the first mode comprises estimated accumulated condensate in the charge air cooler being below a threshold, and wherein the second mode comprises the estimated accumulated condensate being above the threshold.

11. The method of claim 10, wherein the threshold is a first threshold, and wherein dispersing condensate via the vibration device further comprises activating the vibration device when the estimated accumulated condensate is above a second threshold, higher than the first threshold.

12. The method of claim 9, wherein the first mode comprises high engine load, and wherein the second mode comprises low to mid engine load.

13. The method of claim 9, wherein the first mode comprises high intake air velocity conditions, and wherein the second mode comprises low intake air velocity conditions.

14. The method of claim 9, further comprising, during the second mode of operation, dispersing condensate via the vibration device.

15. The method of claim 9, wherein, during the second mode of operation, the vibration device is deactivated.

16. The method of claim 9, wherein routing intake air through a subset of the charge air cooler further comprises closing the valve, which is arranged in an inlet of the charge air cooler, to direct intake air through the subset of the charge air cooler.

17. An engine system comprising:
an intake passage coupled to an intake manifold of an engine; and
a charge air cooler positioned in the intake passage between a compressor and the intake manifold, the charge air cooler comprising:
an inlet including a valve to selectively direct intake air flow through a subset or an entirety of the charge air cooler;
a plurality of cooling tubes;
an outlet; and
a vibration device to disperse accumulated condensate; and
a controller including instructions to activate the vibration device when accumulated condensate in the charge air cooler exceeds a first threshold and further based on a position of the valve, the controller further adjusting the valve based on vibration device activation.

18. The engine system of claim 17, wherein the controller includes further instructions to close the valve to route intake air through the subset of the charge air cooler when the accumulated condensate exceeds a second threshold, higher than the first threshold.

19. The engine system of claim 17, wherein the controller includes further instructions to activate the vibration device when an amount of exhaust gas recirculation exceeds a threshold and/or when engine load is below a threshold.

* * * * *